United States Patent [19]

Asano et al.

[11] 4,111,464
[45] Sep. 5, 1978

[54] PIPE JOINT LOCKING RING AND GROOVE ARRANGEMENT

[75] Inventors: Teryoshi Asano, Kawagoe; Sadao Fukuoka, Hatoyama; Takashi Sawada, Tokorozawa, all of Japan

[73] Assignee: Sekisui Kagaku Kogyo Kabushiki Kaisha, Osaka, Japan

[21] Appl. No.: 759,700

[22] Filed: Jan. 17, 1977

[30] Foreign Application Priority Data

Jan. 19, 1976 [JP] Japan .......................... 51-4711[U]
Apr. 19, 1976 [JP] Japan .......................... 51-49328[U]
Apr. 20, 1976 [JP] Japan .......................... 51-49494[U]

[51] Int. Cl.$^2$ .................................. F16L 25/00
[52] U.S. Cl. ..................... 285/111; 285/321; 285/423; 285/DIG. 22
[58] Field of Search .............. 285/321, 276, 305, 423, 285/110, 111, 308, DIG. 22, 260; 403/326; 277/DIG. 2; 131/225; 85/8.8

[56] References Cited

U.S. PATENT DOCUMENTS

| 738,503 | 9/1903 | Waters | 285/DIG. 22 X |
| 2,727,761 | 12/1955 | Elliott et al. | 285/321 X |
| 2,901,269 | 8/1959 | Rickard | 285/321 X |
| 3,243,206 | 3/1966 | Samer | 285/DIG. 22 X |
| 3,447,819 | 6/1969 | Borsum et al. | 285/111 |
| 4,018,462 | 4/1977 | Saka | 285/423 X |

FOREIGN PATENT DOCUMENTS

| 246,148 | 7/1963 | Australia | 285/321 |
| 309,201 | 9/1971 | U.S.S.R. | 285/321 |

*Primary Examiner*—Werner H. Schroeder
*Assistant Examiner*—Conrad L. Berman
*Attorney, Agent, or Firm*—Sughrue, Rothwell, Mion, Zinn and Macpeak

[57] ABSTRACT

A female pipe joint end 3 has a circular groove 11 and a rectangular circular groove 9 in its expanded inner periphery, and a mating male pipe joint end 6 has a tapered insertion edge 5 and a circular groove 7 in its outer periphery. The side wall of the groove 7 nearest the pipe end is perpendicular to the pipe axis; the opposite side wall is tapered. A packing seal 10 is disposed in the groove 11, and a continuous, relatively rigid locking ring 4 of synthetic resin is disposed in the groove 9 and snap fitted into the groove 7 during assembly. The ring 4 may have a bevelled lip 13, stepped inner and outer peripheries 15, 16, 17, or axial grooves 14 or holes 14' therethrough.

9 Claims, 10 Drawing Figures

PIPE JOINT LOCKING RING AND GROOVE ARRANGEMENT

BACKGROUND OF THE INVENTION

This invention relates to a pipe joint for fitting together synthetic resin pipes in a secure, positive and locking manner.

Heretofore, various kinds of pipe fittings and methods for joining pipes have been developed. There is, for example, a packing type of pipe fitting in which a resilient packing is inserted between the pipes to join them together. In this type of fitting it is necessary to prevent the pipes from slipping apart, since they may otherwise be easily separated again due to their resiliency. In order to obviate this drawback, it is known to provide annular grooves in the inner periphery of the female pipe receiving portion and in the outer periphery of the male pipe insertion portion, and to position a split steel anchor ring in the grooves, as shown in Japanese Patent Publication 6738/64.

However, in such a method, since the metal ring contains a slit, the ring gap may be distorted or bent when the ring widens or narrows its diameter to fit into the annular pipe grooves during assembly, whereby a perfect fit is difficult to obtain. Furthermore, the sharp gap surfaces may bite into the male insertion portion. If the latter is made of a synthetic resin it may thus be easily damaged, or its diameter may become narrow whereby the ring is easily detachable from the pipe. Further, since the ring is made of metal it is easily corroded by the fluids flowing in the pipe, and it is thus almost impossible to use these types of pipe fittings for long periods of time.

In the prior art example shown in FIG. 1, since the stopper ring 4''' fitted into the grooves 7''' and 9''' has a square or rectangular cross section, it may become twisted by the side walls of the grooves and even become detached from the grooves and damaged when a separation force is exerted between the insertion portion 6''' and the receiving portion 3'''. Thus, the ring 4''' may not always provide a tight, secure fit, and it is very difficult to use it in actual practice.

SUMMARY OF THE INVENTION

It is an object of the present invention to overcome the above mentioned drawbacks. Briefly, at the joint of synthetic resin pipes where a packing ring seal is inserted between the male insertion and the female receiving portions, a stopper ring made of rigid synthetic resin is fitted into grooves formed in the inner and outer peripheries of the receiving and insertion portions, respectively, wherein the normal inner diameter of the "unstretched" ring is smaller than the outer diameter of the male insertion portion, but preferably at least 9/10 the diameter thereof.

In addition, both side walls of the stopper ring groove formed in the receiving portion and the side wall of the groove which is nearest to the opening or end of the insertion portion are approximately perpendicular to the center axes of the pipes, and the width of the stopper ring is approximately equal to the width of the groove in the receiving portion. A plurality of grooves may also be formed in a direction parallel to the pipe axis in the inner periphery of the stopper ring, or in the groove formed in the outer periphery of the male insertion portion. Alternatively, penetrating holes may be formed in the side wall of the stopper ring parallel to the pipe axis to communicate the spaces between the insertion and receiving portions divided by the ring.

Furthermore, the outer peripheral surface of the stopper ring may be provided with a stepped notch or groove to present two different outer diameters, wherein the smaller outer diameter is approximately equal to or slightly larger than the inner diameter of the receiving portion.

DETAILED DESCRIPTION OF THE PREFERRED EMBODIMENTS

Figure 1:
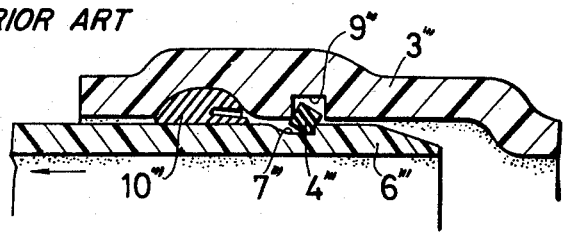
FIG. 1 is a cross-sectional elevation of a pipe joint using a conventional stopper ring.
Figure 2:
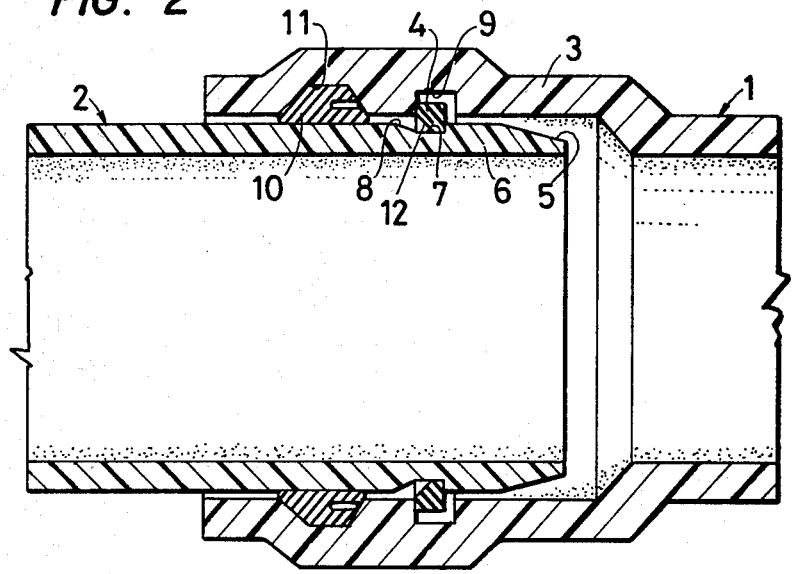
FIG. 2 is a cross-sectional elevation of a pipe joint according to a first embodiment of the present invention.
Figure 3:
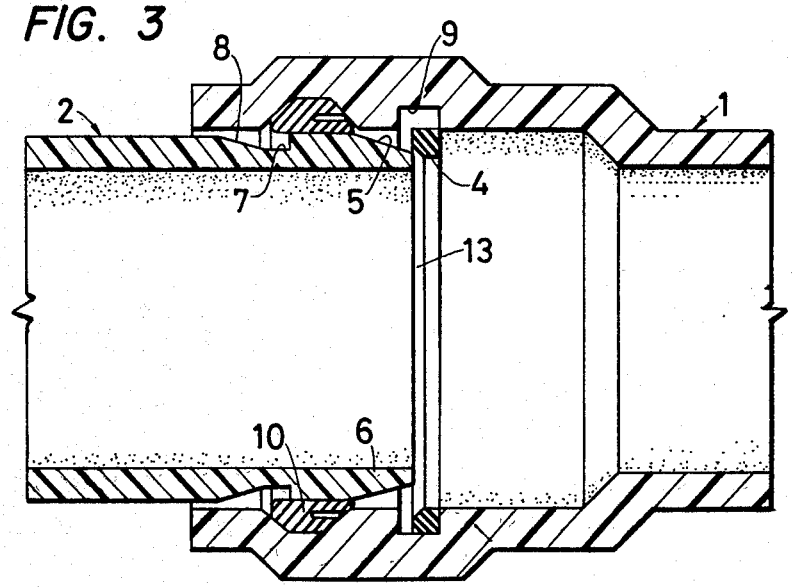
FIG. 3 is a cross-sectional elevation showing the pipes of FIG. 2 during assembly.

In FIGS. 2 and 3, reference numerals 1 and 2 designate pipes made of, for example, rigid vinyl chloride resin. The end portion of pipe 1 is widened to form a female receiving portion 3, and the end portion of pipe 2 defines a male insertion portion 6. Two grooves 9 and 11 are formed in the inner periphery of the pipe 1. A packing 10 is fitted into the groove 11 adjacent the open end of the pipe 1, and an endless stopper ring 4 made of rigid synthetic resin is fitted into the groove 9. A groove 7 is formed in the outer periphery of the insertion portion 6 to accommodate the ring 4. Since the groove 9 is positioned farther away from the open end of the pipe 1 than the packing groove 11, even if the groove depth in the insertion portion leaves just a thin remaining pipe margin, the fluid pressure on both sides of such thin margin is substantially equal or balanced, resulting in a pipe joint having high mechanical strength.

The outer peripheral surface 5 of the insertion portion 6 is tapered to smoothly receive the packing 10 and ring 4 when assembling the pipe joint. The expansion of the ring 4 into the groove 7 is easily made in that the inner peripheral surface of the ring is provided with a tapered lip portion 13, and the diameter of the ring 4 is gradually increased in sliding over the tapered surface 5 towards the groove 7. When the latter is reached, the distorted lip portion simply snaps thereinto.

Further, the most inward side wall of the groove 7 has a tapered surface 8, whereby the packing 10 slides smoothly over the groove 7 without becoming caught or snagged therein during assembly.

The ring 4 is made of rigid synthetic resin, such as rigid vinyl chloride resin polypropylene, or medium to high density polyethylene and ABS resin. The inner diameter of the ring must be smaller than the outer diameter of the insertion portion 6, and is preferably at least 9/10 the diameter thereof. If the inner diameter of the ring is smaller than 9/10 of the outer diameter of the insertion portion, the ring may be excessively widened in sliding over the tapered surface 5, and when the ring is fitted into the groove 7 it may be distorted due to the expansive stress exerted thereon, whereby it will not properly function as a stopper or locking ring.

As shown in FIG. 3, in joining the pipes 1 and 2 the packing 10 is fitted into the groove 11 of the female receiving portion 3 and the ring 4 is fitted into the groove 9, and thereafter the male portion 6 is inserted into the female receiving portion. The ring 4 slides over the outer periphery of the tapered surface, enlarging its diameter as it goes, and upon reaching the groove 7 the stress exerted on the ring is released and it recovers its original shape. The ring audibly snaps into the groove 7, whereby a proper and complete assembly can be easily detected.

Figure 4:
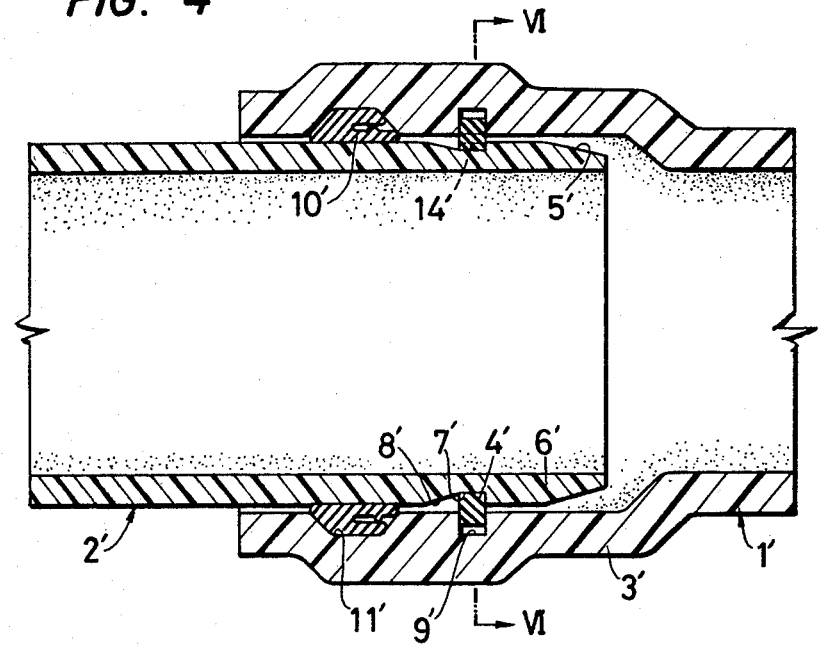
FIG. 4 is a cross-sectional elevation of a pipe joint in accordance with another embodiment of the present invention.
Figure 5:
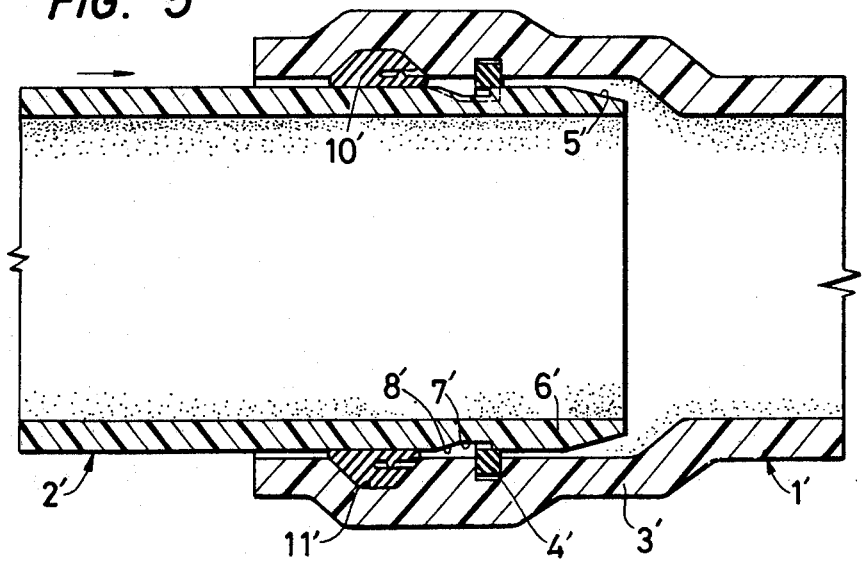
FIG. 5 is a cross-sectional elevation showing the pipes of FIG. 4 during assembly.
Figure 6:
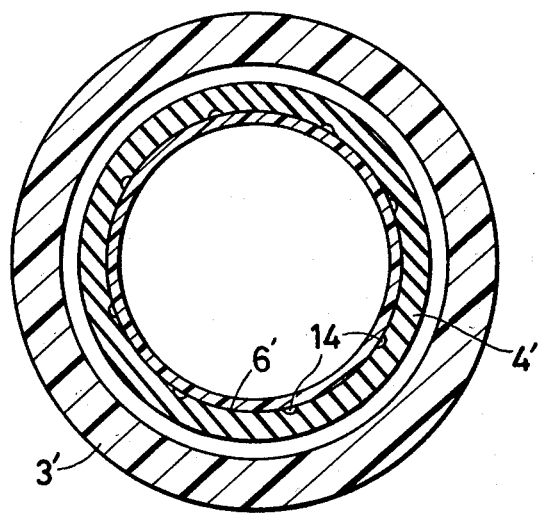
FIG. 6 is a sectional end view taken along lines VI—VI of FIG. 4.

Another embodiment of the invention is shown in FIGS. 4-6. Both side walls of the groove 9' and the side wall of the groove 7' nearest to the open end of the pipe 2' are approximately perpendicular to the axes of the pipes to ensure a good fit between the ring 4' and the grooves 7' and 9', and the width of the ring 4' is approximately equal to the width of the groove 9'.

As shown in FIG. 6, a plurality of grooves 14 parallel to the axis of the pipes 1 and 2 are formed in the inner peripheral surface of the ring 4'. The maximum inner diameter of the grooves 14 is larger than the outer diameter of the insertion portion 6'. Alternatively, a plurality of axial holes 14' may be provided through the opposite side walls of the ring 4' as shown in FIG. 4, such holes being positioned between the inner diameter of the receiving portion 3' and the outer diameter of the insertion portion 6'. It is also preferable to provide axial grooves or slots in the perpendicular side wall of the groove 7' (FIG. 5). These slots and grooves 14 or holes 14' serve to communicate the spaces between the receiving and insertion portions divided or separated by the ring, whereby fluid pressure pulsations in the pipe joint are moderated or absorbed and the stress concentration on the ring receiving grooves, particularly on the corner portions thereof, is relieved, whereby the damage or rupture of the grooves is prevented.

Figure 9A:
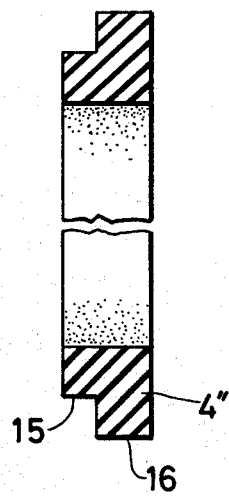
FIG. 9(a) shows an embodiment of the stopper ring employed in FIGS. 7 and 8.
Figure 9B:
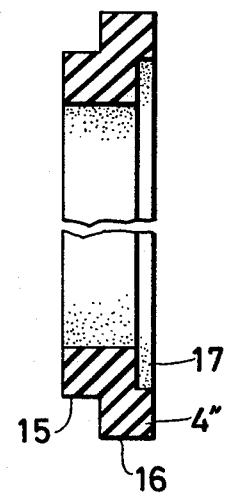
FIG. 9(b) shows another embodiment of the stopper ring employed in FIGS. 7 and 8.
Figure 7:
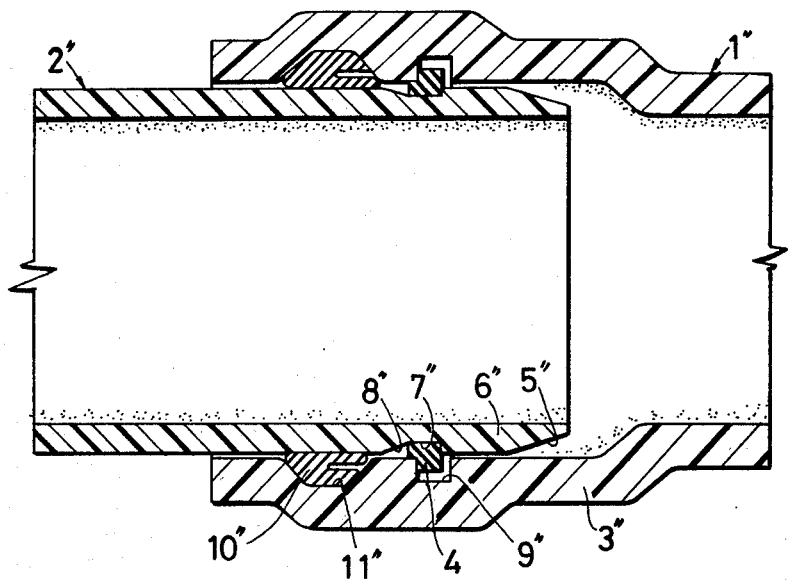
FIG. 7 is a cross-sectional elevation of a pipe joint according to still another embodiment of the present invention.
Figure 8:
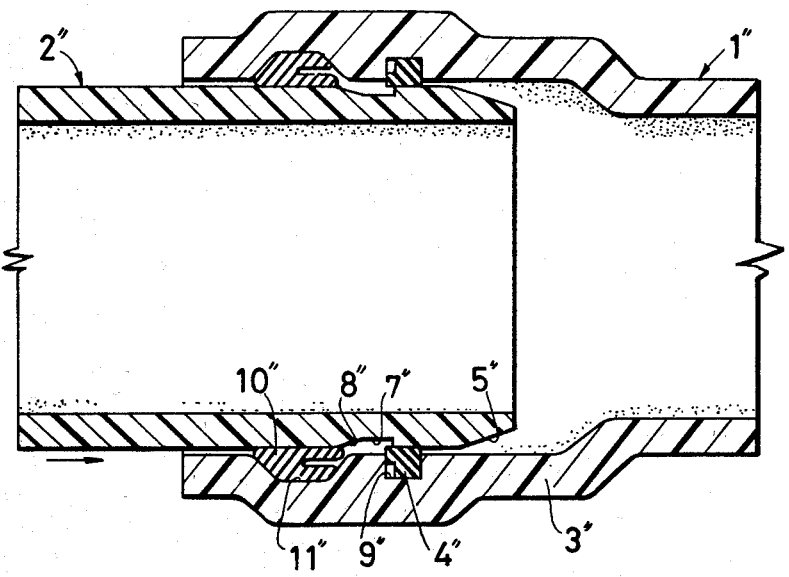
FIG. 8 is a cross-sectional elevation showing the pipes of FIG. 7 during assembly.

FIGS. 7-9 show still another embodiment of the invention. As shown in FIGS. 9(a) and 9(b), the outer surface of the endless ring 4" has a two stepped portion along the axial direction of the ring. The outer diameter of the smaller portion 15 is approximately equal to or smaller than the inner diameter of the receiving portion 3; and the outer diameter of the larger portion 16 is larger than the inner diameter of the receiving portion 3'. The inner diameter of the stopper ring 4" is smaller than the outer diameter of the insertion portion 6". If a separation force is exerted on the assembled pipe joint, the smaller diameter portion 15 rides over the edge of the groove 9" and seats against the inner peripheral surface of the receiving portion 3" adjacent to the groove, which prevents the stopper ring from twisting within the grooves 7" and 9".

In FIG. 9(b), a cut away portion 17 is provided at the edge of the inner periphery of the large diameter portion 16. In the event of a separation force, the cut away portion 17 rides over the edge of the groove 7" and engages the outer peripheral surface of the insertion portion 6" adjacent to the groove, which further prevents the stopper ring from twisting in the grooves 7" and 9".

The stopper ring 4" is formed from a small tube of synthetic resin whereby the corrosion of the ring is prevented; however, it does not have the mechanical strength of a metal ring. Since the synthetic resin stopper ring 4" does not have the mechanical strength of a metal ring, it is important that the ring be substantially rectangular in cross-section in order to provide the highest possible strength. The stopper rings illustrated in each of FIGS. 2-9 are basically rectangular in cross-section with the ring of FIGS. 2 and 3 having a bevelled portion cut from the inner diameter thereof for ease of insertion, the rings of FIGS. 4-6 having axial grooves or holes therein for pressure equalization and the rings of FIGS. 7 and 9 having small portions cut away from the inner and/or outer surfaces thereof to help prevent twisting of the rings when a shear force is applied by the two pipe sections. In some instances, it would be possible to further strengthen the ring without adversely effecting its performance by providing it with a rounded outer surface. For example, the outer corners of the stopper ring as viewed in cross-section in FIGS. 2 and 5 could be rounded off. It is important, however, that the substantially rectangular cross-section of the rings be maintained in order to provide the high mechanical strength desired in such a locking arrangement.

We claim:
1. In a snap-insertion pipe joint including a first synthetic resin pipe (1) having an enlarged, female receiving end (3) with a first circular groove (11) and a second circular groove (9) having side walls perpendicular to the pipe axis in its inner periphery, the first groove being closer to the end of the pipe than the second groove, a second synthetic resin pipe (2) having a male insertion and (6) with a tapered outer edge (5) and a third circular groove (7) in its outer periphery, the third groove having a side wall nearest the outer edge perpendicular to the pipe axis and a tapered opposite side wall (8), a packing ring (10) disposed in the first groove, and a locking ring (4) disposed in an annular space defined by the second and third grooves when the first and second pipes are assembled together, the improvements characterized by:
(a) the locking ring being an endless or continuous ring of substantially rectangular cross-section and formed of a relatively rigid synthetic resin material, and
(b) the normal or unassembled inner diameter of the locking ring being smaller than the outer diameter of the insertion end of the second pipe but at least 9/10 the diameter thereof.

2. A pipe joint as defined in claim 1, wherein the inner peripheral edge (13) of the locking ring on the side facing the end of the first pipe is bevelled, whereby, during assembly, the locking ring slides smoothly over the tapered outer edge of the insertion end and is expanded thereby, and subsequently snaps into the annular space.

3. A pipe joint as defined in claim 1, wherein the outer peripheral surface of the locking ring has a stepped configuration presenting two different diameters, the smaller diameter (15) being approximately equal to the inner diameter of the receiving end.

4. A pipe joint as defined in claim 3, wherein the inner diameter of the locking ring has a stepped configuration presenting two different diameters, the larger diameter (17) being approximately equal to the outer diameter of the insertion end, the stepped inner configuration being on the opposite side of the locking ring from the stepped outer configuration.

5. A pipe joint as defined in claim 1, wherein the third groove has a plurality of spaced, axial slots thereacross.

6. A pipe joint as defined in claim 1, wherein the locking ring has a plurality of spaced, axial grooves in its inner periphery, the maximum depth of said grooves being greater than the depth of the third groove.

7. A pipe joint as defined in claim 6, wherein the third groove has a plurality of spaced, axial slots thereacross.

8. A pipe joint as defined in claim 1, wherein the locking ring has a plurality of spaced, axial holes therethrough, said holes lying between the inner diameter of the receiving end and the outer diameter of the insertion end in the assembled pipe joint.

9. A pipe joint as defined in claim 8, wherein the third groove has a plurality of spaced, axial slots thereacross.

* * * * *